(12) United States Patent
George et al.

(10) Patent No.: US 9,822,824 B2
(45) Date of Patent: Nov. 21, 2017

(54) CLUTCH PACK RELEASE SPRING ENGAGED WITH INNER RACE

(71) Applicant: Schaeffler Technologies GmbH & Co. KG, Herzogenaurach (DE)

(72) Inventors: Philip George, Wooster, OH (US); Jeffrey Hemphill, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 263 days.

(21) Appl. No.: 14/526,202

(22) Filed: Oct. 28, 2014

(65) Prior Publication Data

US 2015/0122609 A1 May 7, 2015

Related U.S. Application Data

(60) Provisional application No. 61/898,943, filed on Nov. 1, 2013.

(51) Int. Cl.
*F16D 25/06* (2006.01)
*F16D 25/0638* (2006.01)

(52) U.S. Cl.
CPC ...... *F16D 25/0638* (2013.01); *F16D 2300/12* (2013.01); *Y10T 29/49826* (2015.01)

(58) Field of Classification Search
CPC ........ F16D 13/52; F16D 13/585; F16D 13/32; F16D 25/0638; F16D 2013/706
USPC ..................................................... 192/66.32
See application file for complete search history.

(56) References Cited

U.S. PATENT DOCUMENTS

| 3,372,782 | A | * | 3/1968 | Nieland | F16D 13/42 192/110 B |
|---|---|---|---|---|---|
| 3,744,606 | A | * | 7/1973 | Bucksch | F16D 25/0638 192/18 A |
| 4,934,502 | A | * | 6/1990 | Horsch | F16D 25/0638 192/109 F |
| 5,437,355 | A | * | 8/1995 | Takagi | B60K 17/28 192/12 C |
| 7,926,635 | B2 | | 4/2011 | Kombowski | |
| 2008/0296115 | A1 | * | 12/2008 | Biles | F16D 25/0638 192/66.32 |
| 2010/0025181 | A1 | * | 2/2010 | Guenter | F16D 25/083 192/85.01 |
| 2013/0056319 | A1 | | 3/2013 | Lindemann et al. | |
| 2014/0109704 | A1 | * | 4/2014 | Machida | F16D 21/06 74/330 |
| 2014/0262676 | A1 | * | 9/2014 | Niwata | F16D 25/0638 192/85.24 |

OTHER PUBLICATIONS

Definition of "snap ring," retrieved from www.merriamwebster.com on Jan. 9, 2017.*

* cited by examiner

*Primary Examiner* — Stacey Fluhart
(74) *Attorney, Agent, or Firm* — Davidson, Davidson & Kappel, LLC

(57) ABSTRACT

A clutch assembly for a motor vehicle drive train is provided. The clutch assembly includes a clutch pack; a piston for engaging the clutch pack; a housing including a surface for slidably supporting the piston; a release spring for disengaging the piston from the clutch; and a bearing supporting the clutch pack. The bearing limiting axial movement of the release spring away from the piston. A method of assembling a clutch assembly is also provided.

18 Claims, 2 Drawing Sheets

CLUTCH PACK RELEASE SPRING ENGAGED WITH INNER RACE

This claims the benefit to U.S. Provisional Patent Application No. 61/898,943, filed on Nov. 1, 2013, which is hereby incorporated by reference herein.

The present disclosure relates generally to clutch assemblies for motor vehicle transmissions and more particularly to release springs for pistons in clutch assemblies.

BACKGROUND

U.S. Pat. No. 6,095,941 discloses a clutch assembly including a release spring retained by a snap ring.

SUMMARY OF THE INVENTION

A clutch assembly for a motor vehicle drive train is provided. The clutch assembly includes a clutch pack; a piston for engaging the clutch pack; a housing including a surface for slidably supporting the piston; a release spring for disengaging the piston from the clutch; and a bearing supporting the clutch pack. The bearing limiting axial movement of the release spring away from the piston.

A method of assembling a clutch assembly for a motor vehicle drive train is also provided. The method includes sliding a piston onto a surface of a housing; sliding a retainer spring against the piston; and sliding an inner race of a bearing onto the housing such that the inner race of the bearing limits axial movement of the release spring away from the piston.

BRIEF DESCRIPTION OF THE DRAWINGS

The present invention is described below by reference to the following drawings, in which.

DETAILED DESCRIPTION

The present disclosure provides a one-way clutch inner race used as a reaction point for a clutch pack release spring. In the embodiments discussed below, the outer race serves as a clutch carrier for a series of clutch plates. The piston is released by a release spring acting between the piston and the inner race.

Figure 1:
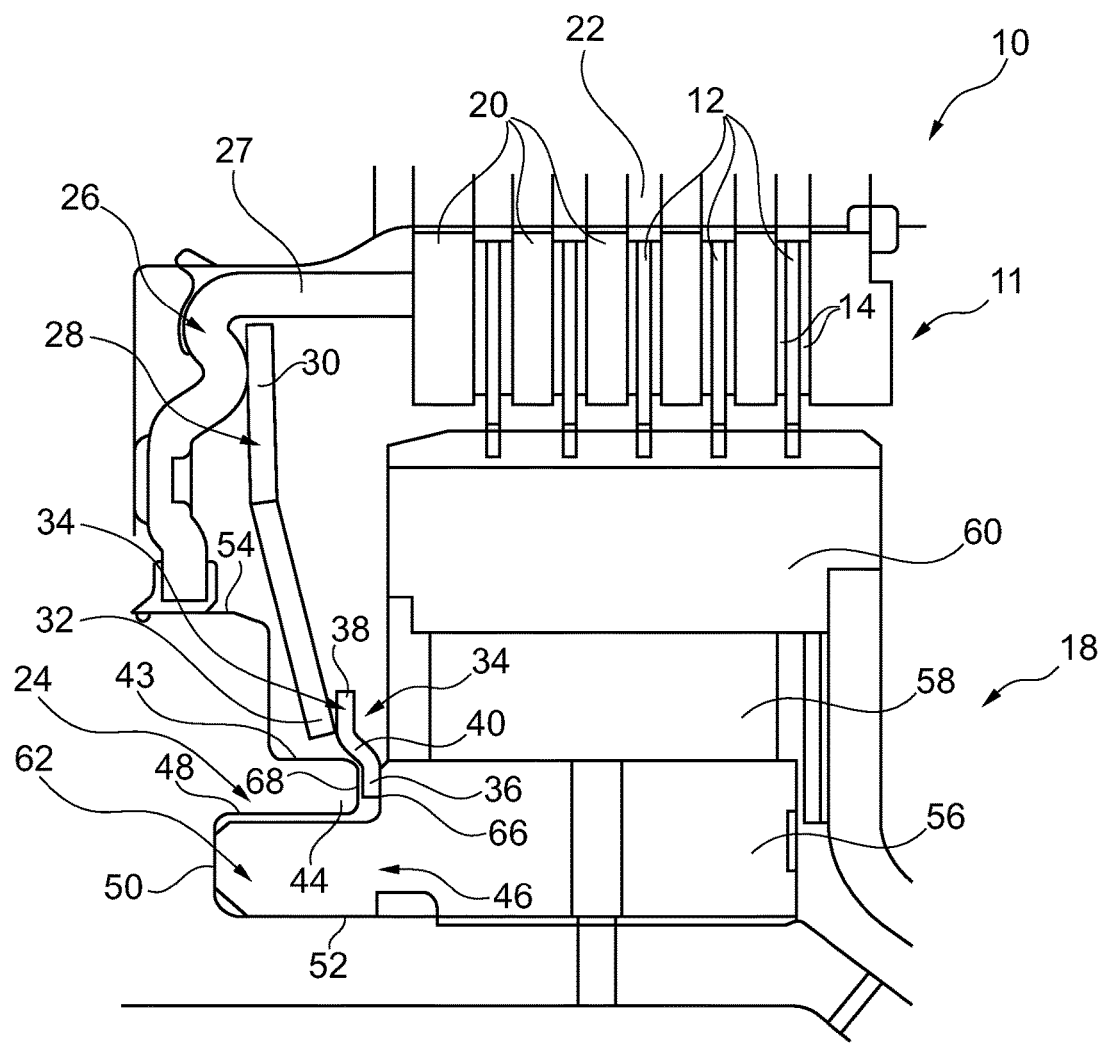
FIG. 1 shows a clutch assembly for a transmission in a motor vehicle drive train in accordance with a first embodiment of the present invention.

FIG. 1 shows a clutch assembly 10 for a transmission in a motor vehicle drive train in accordance with a first embodiment of the present invention. Clutch assembly 10 includes a clutch pack 11 formed by a plurality of clutch plates 12 including friction surfaces 14 on both sides thereof that are axially slidable along an outer radial surface of a bearing 18 and a plurality of clutch plates 20 that are axially slidable along an outer support 22 of a housing 24. An axially slidable piston 26 is forced toward and away from the end clutch plate 20 to engage and disengage clutch pack 11 with an axial extension 27 thereof. In order to engage clutch pack 11, a force exerted on piston 26 in the direction of clutch pack 11 needs to overcome a force exerted by a return spring 28 onto piston 26. Return spring 28 is positioned radially inside of axial extension 27 and contacts piston 26 with a radially outer portion 30 thereof. An inner radial end 32 of return spring 28 is held axially in place by a snap ring 34, which contacts return spring 28 on a side of return spring 28 opposite of a side return spring 28 that contacts piston 26.

Snap ring 34 includes an inner radially extending portion 36 and an outer radially extending portion 38 that are axially offset from each other by an axially extending portion 40 connecting radially extending portions 36, 38. Outer radially extending portion 38 is arranged axially further away from bearing 18 than inner radially extending portion 36 and contacts inner radial end 32 of return spring 28. In contrast to U.S. Pat. No. 6,095,941, snap ring 34 is not machined into housing 24. Instead, snap ring 34 is sandwich axially between a radially extending surface 68 of an axially protruding lip 44 of housing 24 and a radially extending surface 66 of inner race 56 that aligns with a radially extending surface 68. Axially protruding lip 44 hangs over an annularly shaped blind hole 46 formed by an inner radial surface 48 of lip 44, an axial stop 50 and a first radial support surface 52 of housing 24. Housing 24 also includes a second radial support surface 54 radially outside of the axially protruding lip 44, which piston 26 slides axially along during engagement and disengagement of clutch pack 11.

Bearing 18 is supported by first radial support surface 52 and includes an inner race 56 contacting first radial support surface 52, a rolling element 58 riding along inner race 56 and an outer race 60 radially outside of rolling bearing 58 that includes a splined surface for receiving clutch plates 12. Bearing 18, at inner race 56, includes an axial protrusion 62 received radially inside of axially protruding lip 44 and contacting axial stop 50. Protrusion 62 includes an outer radial surface 64 aligned with inner radial surface 48 of lip 44 that extends axially from a radial extending surface 66 of inner race 56 that aligns with a radially extending surface 68 of lip 44.

To assemble clutch assembly 10, piston 26 is first slid onto second radial support surface 54, then retainer spring 28 is slid against piston 26. Next, snap ring 34 is slid onto housing 24 such that inner radially extending portion 36 contacts a radially extending surface 68 of lip 44 and inner race 56, either alone or with rolling element 58 and possibly outer race 60, is slid onto first radial support surface 52 of housing 24 such that protrusion 62 is received radially inside of axially protruding lip 44 and contacts axial stop 50 and radially extending surface 66 of inner race 56 contacts snap ring 34 at inner radially extending portion 36 to fix return spring 28 and snap ring 34 in place.

Figure 2:
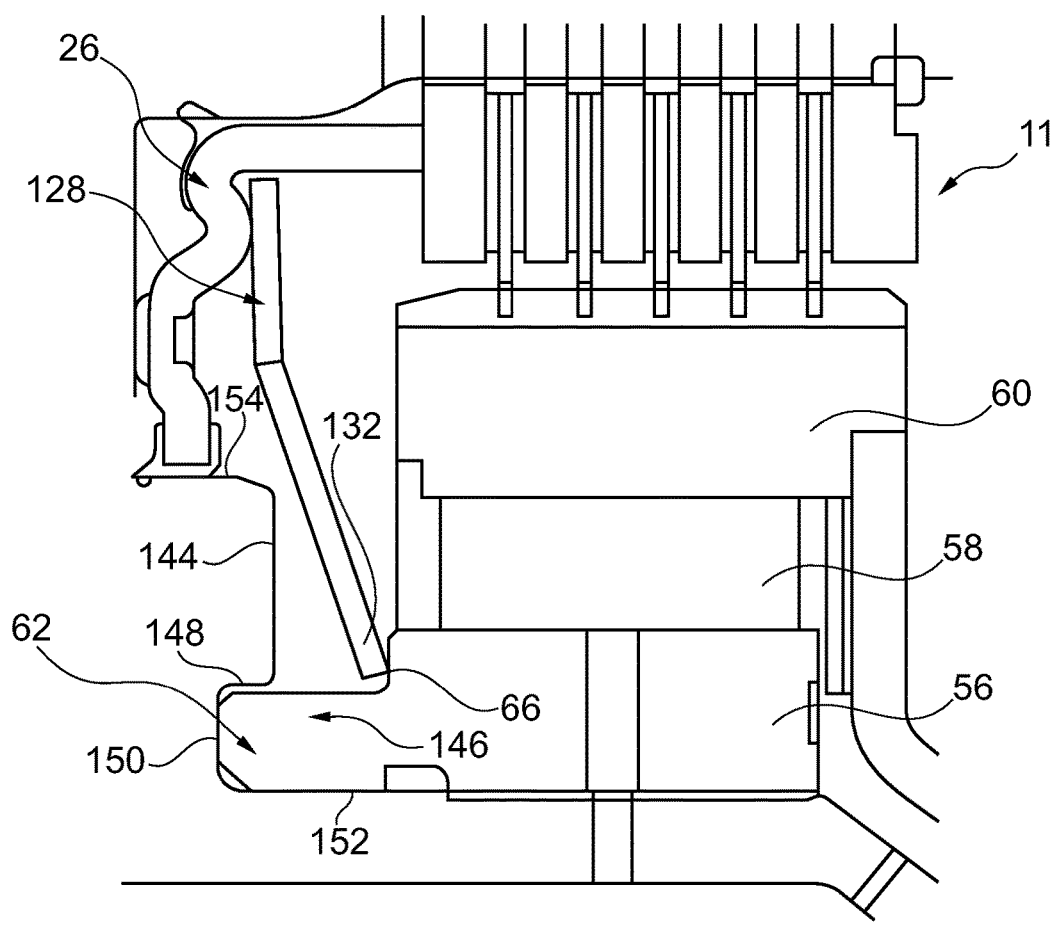
FIG. 2 shows a clutch assembly for a transmission in a motor vehicle drive train in accordance with a second embodiment of the present invention.

FIG. 2 shows a clutch assembly 110 for a transmission in a motor vehicle drive train in accordance with a third embodiment of the present invention. Clutch assembly 110 is formed in substantially the same manner as clutch assembly 10, with the only differences being the constructions of housing 124, the elimination of snap ring 34 and replacing return spring 28 with a longer return spring 128. In this embodiment, because snap ring 34 is not used for retaining return spring 128, housing 124, like housing 24 from the first embodiment, does not include an annular groove machined therein. Additionally, axially protruding lip 44 is replaced by a more compact axially protruding lip 124 that is spaced away from radially extending surface 66. Instead of using the housing to help retain return spring 128, return spring 128 is retained directly by inner race 56. Inner race 56 is fixed in place on a first support surface 152 of housing such that inner race 56 directly contacts inner radial end 132 of return spring 128. Radially extending surface 66 of inner race 56 forms an axial stop contacting release spring 128 to limit the axial movement of release spring 128 away from piston 26.

Axially protruding lip 144 hangs over an annularly shaped blind hole 146 formed by an inner radial surface 148 of lip 144, an axial stop 150 and first radial support surface 152 of housing 124. Housing 124 also includes a second radial support surface 154 radially outside of the axially protruding lip 144, which piston 26 slides axially along during engagement and disengagement of clutch pack 11.

To assemble clutch assembly 110, piston 26 is first slid onto second radial support surface 154, then retainer spring 128 is slid against piston 26. Next, inner race 56, either alone or with rolling element 58 and possibly outer race 60, is slid onto first radial support surface 152 of housing 124 such that an end of protrusion 62 is received radially inside of axially protruding lip 144 and contacts axial stop 150 and radially extending surface 66 of inner race 56 directly contacts inner radial end 132 of return spring 128 to fixed return spring 128 in place.

In comparison with a clutch assembly having an annular groove machined into the housing, clutch assemblies 10, 110 may be advantageous in that the elimination groove 42 and snap ring 34 saves cost.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A clutch assembly for a motor vehicle drive train comprising:
   a clutch pack;
   a piston for engaging the clutch pack;
   a housing including a surface for slidably supporting the piston;
   a release spring for disengaging the piston from the clutch pack; and
   a bearing supporting the clutch pack, the bearing including an inner race, a roller element and an outer race, the inner race including a radially extending surface defining an axial stop, the axial stop limiting axial movement of the release spring away from the piston, the release spring including a radially outer portion for forcing the piston away from the clutch pack, the release spring including a radially inner portion extending radially inward from the radially outer portion, the radially inner portion including a radially inner end, the axial stop contacting the radially inner end directly or via a ring to limit the axial movement of the release spring away from the piston, the inner race including an axial protrusion radially inside of the axial stop protruding with respect to the axial stop and configured for axially contacting the housing to align the bearing on the housing.

2. The clutch assembly as recited in claim 1 wherein the axial stop contacts the release spring to limit the axial movement of the release spring away from the piston.

3. The clutch assembly as recited in claim 1 further comprising the ring sandwiched between the bearing and the housing, the bearing limiting the axial movement of the release spring away from the piston via the ring.

4. The clutch assembly as recited in claim 3 wherein the housing includes an axial stop and an axially protruding lip hanging over the axial stop of the housing, the bearing including an axial protrusion received radially inside of the axially protruding lip, the axial protrusion contacting the axial stop of the housing.

5. The clutch assembly as recited in claim 4 wherein the ring is sandwiched between the axially protruding lip and a surface of the bearing extending radially away from the axial protrusion.

6. The clutch assembly as recited in claim 4 wherein the surface that the piston axially slides along is radially outside of the axially protruding lip.

7. The clutch assembly as recited in claim 4 wherein the inner race and the axially protruding lip contact the ring to sandwich the ring.

8. The clutch assembly as recited in claim 7 wherein the inner race includes the radially extending surface of the inner race extends radially away from the axial protrusion, the ring being sandwiched between the radially extending surface of the inner race and a radially extending surface of the axially protruding lip.

9. The clutch assembly as recited in claim 1 wherein the bearing directly contacts the release spring to hold the release spring against the piston.

10. The clutch assembly as recited in claim 9 wherein the inner race directly contacts the release spring.

11. The clutch assembly as recited in claim 10 wherein the radially extending surface directly contacts the release spring.

12. The clutch assembly as recited in claim 1 wherein the housing includes an axial stop and an axially protruding lip hanging over the axial stop of the housing, the axial protrusion received radially inside of the axially protruding lip, the axial protrusion contacting the axial stop of the housing.

13. A clutch assembly for a motor vehicle drive train comprising:
   a clutch pack;
   a piston for engaging the clutch pack;
   a housing including a surface for slidably supporting the piston;
   a release spring for disengaging the piston from the clutch pack;
   a bearing supporting the clutch pack, the bearing limiting axial movement of the release spring away from the piston; and
   a ring sandwiched between the bearing and the housing, the bearing limiting the axial movement of the release spring away from the piston via the ring,
   wherein the housing includes an axial stop and an axially protruding lip hanging over the axial stop, the bearing including an axial protrusion received radially inside of the axially protruding lip, the axial protrusion contacting the axial stop.

14. The clutch assembly as recited in claim 13 wherein the ring is sandwiched between the axially protruding lip and a surface of the bearing extending radially away from the axial protrusion.

15. The clutch assembly as recited in claim 13 wherein the surface that the piston axially slides along is radially outside of the axially protruding lip.

16. A clutch assembly for a motor vehicle drive train comprising:
   a clutch pack;
   a piston for engaging the clutch pack;
   a housing including a surface for slidably supporting the piston;
   a release spring for disengaging the piston from the clutch pack; and a bearing supporting the clutch pack, the bearing limiting axial movement of the release spring away from the piston;

wherein the housing includes an axial stop and an axially protruding lip hanging over the axial stop, an inner race of the bearing including an axial protrusion received radially inside of the axially protruding lip, the axial protrusion contacting the axial stop.

17. The clutch assembly as recited in claim 16 wherein a radially inner end of the spring is arranged axially between the axially protruding lip and a surface of the bearing extending radially away from the axial protrusion.

18. The clutch assembly as recited in claim 16 wherein the surface that the piston axially slides along is radially outside of the axially protruding lip.

* * * * *